Jan. 4, 1966          T. MUSZUMANSKI          3,227,041
TWO COMPONENT AFOCAL WIDE-ANGLE SUPPLEMENTARY OBJECTIVE
Filed March 29, 1962
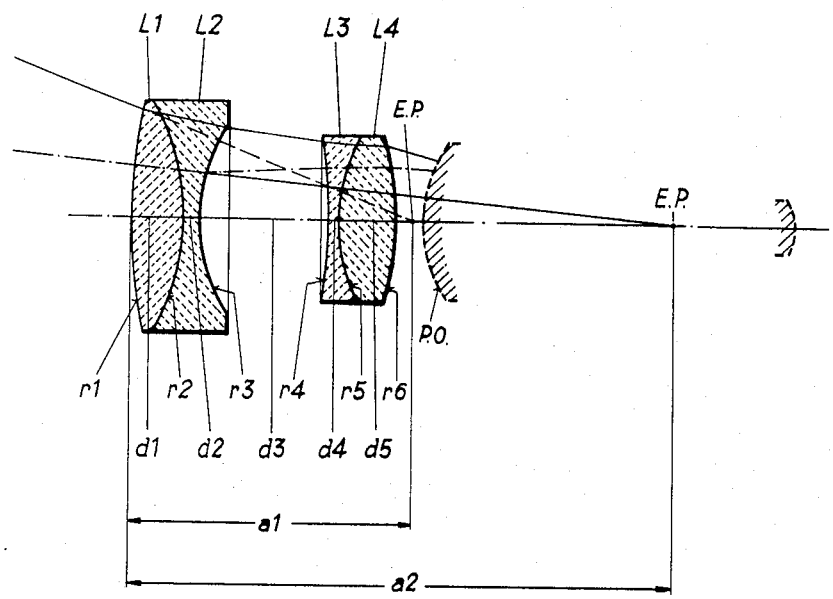
INVENTOR.

United States Patent Office 3,227,041
Patented Jan. 4, 1966

3,227,041
TWO COMPONENT AFOCAL WIDE-ANGLE
SUPPLEMENTARY OBJECTIVE
Trude Muszumanski, Vienna, Austria, assignor to Karl Vockenhuber and Christl Hauser, both of Vienna, Austria
Filed Mar. 29, 1962, Ser. No. 183,430
Claims priority, application Austria, Apr. 6, 1961,
A 2,765/61
4 Claims. (Cl. 88—57)

The present invention relates to a wide-angle supplementary objective for objectives with different focal length, in particular for varifocal objectives, of the type comprising one positive and one negative component, which are arranged in the manner of a reversed Galilean telescope and each of which consists of two lenses cemented together.

When designing supplementary objectives for objectives with variable focal length, exceptional difficulties occur, in that the angular field as well as the location and size of the entrance pupil of the objective-combination in question change when the focal length is varied. Similar problems also occur, if a supplementary objective is to be designed for a series of objectives with different focal lengths.

It is one object of the present invention to provide an afocal wide-angle supplementary objective, which overcomes or mitigates the mentioned difficulties. A way is shown, by which correction of the supplementary objective, even under the above mentioned conditions, can be achieved.

It is another object of the present invention to provide an afocal wide-angle supplementary objective, wherein, with a supplementary objective of the above mentioned type, abnormal glasspairs of a special type are used in both components, that means that the refractive index $n_d$ as well as Abbé's dispersion number $\nu$ of one lens of a cemented component are greater than the respective values for the second lens of that component; the $n_d$ difference in the positive component is furthermore at least twice as great as the $n_d$ difference in the negative component.

With wide-angle supplementary objectives, where the negative and the positive component consist of one cemented member and one single lens, it has been suggested to design the cemented member of the negative component as an abnormal glasspair.

In another known supplementary objective, the negative component consists of a single lens and one cemented member, whereas the positive component is cemented and constructed as an abnormal glasspair. Both the two mentioned supplementary objectives are corrected for specific main objectives of fixed focal length. Consequently, in these systems, the problems which arise from the changing of the object-angle and the entrance pupil with the varying focal length main objectives, are not taken into account.

It is still another object of the present invention to provide an afocal wide-angle supplementary objective, wherein the lenses nearer the object in both cemented components have the lesser refractive index $n_d$ and therefore also the smaller Abbé's dispersion number $\nu$.

It is yet another object of the present invention to provide an afocal wide-angle supplementary objective, wherein the negative component is composed of one biconvex lens and one biconcave lens, with the radius $r_3$ of the rear surface of the latter approximately equal to half the focal length $f_1$ of the negative component. The positive component consists of one biconcave lens and one biconvex lens, with the radius $r_6$ of the rear surface of the latter approximately equal to half the focal length $f_2$ of the positive component. The radius $r_2$ of the cemented surface of the negative component equals approximately $\frac{4}{3} r_3$, whereas the radius $r_5$ of the joint cement surface of the positive component is less than or equal $\frac{1}{3} f_2$.

It is also a further object of the present invention to provide an afocal wide-angle supplementary objective, wherein the difference of Abbé's dispersion numbers $(\nu_5-\nu_4)$ is at least 16.6 in the positive component, the difference of Abbé's dispersion numbers $(\nu_2-\nu_1)$ in the negative component at least 14.0, and the maximum refractive index $n_d$ of the lenses used in the total system is 1.6584.

Through the last mentioned characteristic a remarkable economic advantage is obtained. Due to the large object-angle in the wide-angle position and the large distance of the entrance pupil from the first lens surface in the tele-position of the varifocal objective, considerable diameters for the lenses of the supplementary objective result with the high-power objectives in use today. Thus it is of crucial importance that the use of high-refracting and expensive special glasses can be dispensed with, so that a production of supplementary objectives at a reasonable price is possible, in spite of the considerable volume of the objectives.

With these and other objects in view, which will become apparent in the following detailed description, the present invention will be clearly understood in connection with the accompanying drawing, in which the only figure is a schematic section of the positive and of the negative component of the wide-angle supplementary objective.

In accordance with the numerical examples in the drawing, the radii of the lenses are marked with $r_1$, $r_2$, $r_3$, $r_4$, $r_5$ and $r_6$, the thicknesses of the lenses and the air distance with $d_1$, $d_2$, $d_3$, $d_4$ and $d_5$. The two supplementary objectives are designed for a varifocal objective principal objective P.O. with a range of focal length of 7.25–29.5, which varifocal objective can have any suitable construction.

In a first embodiment the following relative values are given to the variables:

[Enlargement factor: 0.68]

| | | | | |
|---|---|---|---|---|
| $r_1=+103.18$ | $d_1=10.1$ | $n_{d1}=1.6236$ | $\nu_1=36.8$ | |
| $r_2=-42.08$ | $d_2=2.9$ | $n_{d2}=1.6584$ | $\nu_2=50.8$ | $f_1=-68.1$ |
| $r_3=+31.50$ | $d_3=24.84$ | Air space | | |
| $r_4=-113.91$ | $d_4=2.2$ | $n_{d4}=1.5487$ | $\nu_4=45.4$ | |
| $r_5=+31.64$ | $d_5=10.9$ | $n_{d5}=1.6212$ | $\nu_5=62.0$ | $f_2=+100.0$ |
| $r_6=-50.82$ | | | | |

In a second embodiment the following relative values are given to the variables:

[Magnification factor: 0.68]

| | | | |
|---|---|---|---|
| $r_1 = +103.61$ | $d_1 = 10.1$ | $n_{d1} = 1.6236$ | $v_1 = 36.8$ |
| $r_2 = -43.50$ | $d_2 = 2.9$ | $n_{d2} = 1.6584$ | $v_2 = 50.8$ |
| $r_3 = +31.50$ | $d_3 = 24.85$ | Air space | |
| $r_4 = -115.85$ | $d_4 = 2.2$ | $n_{d4} = 1.5487$ | $v_4 = 45.4$ |
| $r_5 = +32.76$ | $d_5 = 10.9$ | $n_{d5} = 1.6212$ | $v_5 = 62.0$ |
| $r_6 = -50.82$ | | | |

$f_1 = -68.1$
$f_2 = +100.0$

The distances and radii relate to the focul distance of the positive member, which focal distance hase been assumed as 100.

The two supplementary objectives are corrected for a variable position of the entrance pupil E.P. of the total objective combination, whose distance $a_1$ from the supplementary objective in the wide angle position of the varifocal objective P.O. is approximately 55, while the distance $a_2$ in the teleposition of the varifocal objective approximately 107. Along with the movement of the entrance pupil a changing of the angular field occurs. As a result, the main rays pass the individual lenses at different heights and at different inclinations, according to the setting of the focal length of the varifocal objective. In the drawing, a main ray for the wide-angle setting of the varifocal objective and a second one for the teleposition of this objective are shown.

In spite of the above mentioned unfavorable conditions, the arrangement according to the present invention permits the elimination of the aberrations in the over-all range of the focal length, and that with a moderate cost.

The new supplementary objective can be used not only in connection with varifocal objectives, but also in connection with objectives with different focal length and of standard construction.

While I have disclosed several embodiments of the present invention, it is to be understood that these embodiments are given by example only and not in a limiting sense, the scope of the present invention being determined by the objects and claims.

I claim:

1. An afocal wide-angle supplementary objective for the use on the front of photographic objectives of different, positive refractive powers, said supplementary objective being constructed in the manner of a reversed Galilean telescope, comprising one negative front component and one positive rear component, said components being axially aligned and approximately afocally spaced, each of said components consisting of two lenses cemented together, and both said components including abnormal glasspairs whereby the refractive index $n_d$, as well as the Abbé's dispersion number $v$ of one lens of each of said cemented components are bigger than the respective values of the second lens of each of said components and the difference between the refractive indices $n_d$ in said positive component is at least twice as big as the difference between the refractive indices $n_d$ in said negative component, a biconvex front lens and a biconcave rear lens, said lenses being cemented together, to constitute said negative front component, the radius of the rear surface of said biconcave lens being approximately equal to one half the focal length of said negative front component, the radius of the joint cement surface of said negative front component being equal to approximately ⅔ of the radius of the rear surface thereof, and a biconcave front lens and a biconvex rear lens, said lenses being cemented together to constitute said positive rear component, the radius of the rear surface of said biconvex rear lens being approximately equal to half the focal length of said positive rear component, whereas the radius of the joint cement surface of said positive rear component being at most ⅓ of the focal length of said positive rear component.

2. The focal wide-angle supplementary objective, as set forth in claim 1, wherein the difference of the Abbé's dispersion numbers in said positive rear component is at least 16.6, the difference of the Abbé's dispersion numbers in said negative front component is at least 14.0 and the maximum refraction index $n_d$ of the lenses used in the total system is 1.6584.

3. An afocal wide-angle supplementary objective for the use on the front of photographic objectives of different, positive refractive powers, said supplementary objective being constructed in the manner of a reversed Galilean telescope, comprising one negative front component and one positive rear component, said components being axially aligned and approximately afocally spaced, each of said components consisting of two lenses cemented together, and both said components including abnormal glasspairs whereby the refractive index $n_d$, as well as the Abbé's dispersion number $v$ of one lens of each of said cemented components are bigger than the respective values of the second lens of each of said components, and the difference between the refractive indices $n_d$ in said positive components is at least twice as big as the difference between the refractive indices $n_d$ in said negative component, said objective complying substantially with the following table, whereby beginning with the front end of said objective $L_1$ to $L_4$ designate said lenses $r_1$ to $r_6$ designate the radii of curviture of said lenses, the + and − values of the radii indicate the surfaces of the lenses being convex and concave, respectively, toward the front of said objective, $d_1$ to $d_5$ designate the axial thickness and the axial separations, $n_{d1}$ to $n_{d5}$ are the refractive indices for the $d$-line $v_1$ to $v_5$ are the Abbé's dispersion numbers, and $f_1$ and $f_2$ are the focal lengths of said negative component and of said positive component, respectively

[Magnification factor: 0.68]

| | | | | |
|---|---|---|---|---|
| $L_1$ | $r_1 = +103.18$ | $d_1 = 10.1$ | $n_{d1} = 1.6236$ | $v_1 = 36.8$ |
| | $r_2 = -42.08$ | $d_2 = 2.9$ | $n_{d2} = 1.6584$ | $v_2 = 50.8$ |
| $L_2$ | $r_3 = +31.50$ | $d_3 = 24.84$ | Air space | |
| | $r_4 = -113.91$ | $d_4 = 2.2$ | $n_{d4} = 1.5487$ | $v_4 = 45.4$ |
| $L_3$ | $r_5 = +31.64$ | $d_5 = 10.9$ | $n_{d5} = 1.6212$ | $v_5 = 62.0$ |
| $L_4$ | $r_6 = -50.82$ | | | |

$f_1 = -68.1$
$f_2 = +100.0$

4. An afocal wide-angle supplementary objective for the use on the front of photographic objectives of different, positive refractive powers, said supplementary objective being constructed in the manner of a reversed Galilean telescope, comprising one negative front component and one positive rear component, said components being axially aligned and approximately afocally spaced, each of said components consisting of two lenses cemented together, and both said components including abnormal glasspairs whereby the refractive index $n_d$, as well as the Abbé's dispersion number $v$ of one lens of each of said cemented components are bigger than the respective values of the second lens of each of said components, and the difference between the refractive indices $n_d$ in said positive component is at least twice as big as the difference between the refractive indices $n_d$ in said negative component, said objective complying substantially with the following table, whereby beginning with the front end of said objective $L_1$ to $L_4$ designate said lenses, $r_1$ to $r_6$ designate the radii of curvature of said lenses, the + and − values of the radii indicate the surfaces of the lenses being convex and concave, respectively, toward the front of said objective, $d_1$ to $d_5$ designate the axial thickness and the axial separations, $n_{d1}$ to $n_{d5}$ are the refractive indices for the $d$-line, $v_1$ to $v_5$ are the Abbé's dispersion numbers, and $f_1$ and $f_2$ are the focal lengths of said negative component and of said positive component, respectively

[Magnification factor: 0.68]

| | | | | | |
|---|---|---|---|---|---|
| $L_1$ | $r_1=+103.61$ | $d_1=10.1$ | $n_{d1}=1.6236$ | $\nu_1=36.8$ | $f_1=-68.1$ |
| $L_2$ | $r_2=-43.50$ | $d_2=2.9$ | $n_{d2}=1.6584$ | $\nu_2=50.8$ | |
| | $r_3=-31.50$ | $d_3=24.85$ | Air space | | |
| | $r_4=-115.85$ | | | | |
| $L_3$ | $r_5=+32.76$ | $d_4=2.2$ | $n_{d4}=1.5487$ | $\nu_4=45.4$ | $f_2=+100.0$ |
| $L_4$ | $r_6=-50.82$ | $d_5=10.9$ | $n_{d5}=1.6212$ | $\nu_5=62.0$ | |

References Cited by the Examiner

UNITED STATES PATENTS

| 1,776,398 | 9/1930 | Shore | 88—57 |
| 2,507,164 | 5/1950 | Kingslake | 88—57 |
| 2,582,085 | 1/1952 | Tolle | 88—57 |
| 2,956,475 | 10/1960 | Harris et al. | 88—57 |

DAVID H. RUBIN, *Primary Examiner.*

JEWELL H. PEDERSEN, *Examiner.*

JOHN K. CORBIN, *Assistant Examiner.*